United States Patent
Van Hartingsveldt et al.

(10) Patent No.: US 7,208,542 B2
(45) Date of Patent: Apr. 24, 2007

(54) GLASS FIBRE REINFORCED POLYCARBONATE COMPOSITION MET IMPROVED TOUGHNESS

(75) Inventors: Edwin A. A. Van Hartingsveldt, Maastricht (NL); Martinus L. M. Bos, Born (NL)

(73) Assignee: DSM IP Assets B.V., Te Heerlen (NL)

(*) Notice: Subject to any disclaimer, the term of this patent is extended or adjusted under 35 U.S.C. 154(b) by 0 days.

(21) Appl. No.: 10/513,663

(22) PCT Filed: Apr. 25, 2003

(86) PCT No.: PCT/NL03/00309

§ 371 (c)(1), (2), (4) Date: Jun. 13, 2005

(87) PCT Pub. No.: WO03/095558

PCT Pub. Date: Nov. 20, 2003

(65) Prior Publication Data

US 2005/0256246 A1    Nov. 17, 2005

(30) Foreign Application Priority Data

May 8, 2002 (NL) .................................... 1020568

(51) Int. Cl.
*C08K 3/40* (2006.01)
(52) U.S. Cl. ................................ 524/494
(58) Field of Classification Search .............. 524/494
See application file for complete search history.

(56) References Cited

U.S. PATENT DOCUMENTS 4,358,556 A    11/1982   van Abeelen
4,374,177 A *   2/1983   Hsu et al. ............... 428/392
4,537,930 A    8/1985   Bussink
5,288,801 A    2/1994   Ishii

FOREIGN PATENT DOCUMENTS

| DE | 28 39 356 | 3/1979 |
|---|---|---|
| DE | 39 26 904 | 2/1991 |
| DE | 198 28 535 | 12/1999 |
| EP | 053 825 | 12/1984 |
| EP | 363 608 | 1/1994 |
| EP | 538 854 | 7/1998 |
| GB | 2004284 | 3/1979 |

* cited by examiner

*Primary Examiner*—Kriellion Sanders
(74) *Attorney, Agent, or Firm*—Nixon & Vanderhye P.C.

(57) ABSTRACT

The invention relates to a polycarbonate composition containing: a) 40–69.5 mass % of aromatic polycarbonate having a limiting viscosity number of 43–52 ml/g, b) 30–50 mass % of sized glass fibres, c) 0.5–5 mass % of at least one partially hydrogenated block copolymer containing at least two terminal polymer blocks A of a monoalkenylarene and at least one intermediate polymer block B of a conjugated diene, and optionally d) 0–25 mass % of other additives, and where the sum of a–d) is 100%. The composition combines improved toughness, for example increased elongation at break and improved environmental stress cracking resistance, and high strength and rigidity. The invention also relates to a process for producing the polycarbonate composition according to the invention, to a moulded part that contains this composition and to an article that contains such a moulded part.

13 Claims, No Drawings

GLASS FIBRE REINFORCED POLYCARBONATE COMPOSITION MET IMPROVED TOUGHNESS

CROSS REFERENCE TO RELATED APPLICATION

This application is the National Phase of International Application PCT/NL/03/00309 filed Apr. 25, 2003 which designated the U.S., and was published in the English language.

The invention relates to a glass fibre reinforced and elastomer-modified polycarbonate composition. The invention also relates to a process for producing a polycarbonate composition according to the invention, to a moulded part containing this composition and to an article containing such moulded part.

Such a polycarbonate composition is known from for example patent application DE 3926904 A1. That publication describes a polycarbonate composition containing 30 to 93 mass % of polycarbonate, 5 to 50 mass % of glass fibres and 2 to 20 mass % of at least one elastomer. This composition preferably contains as elastomer 6 to 15 mass % of an ABS, that is, a graft copolymer of at least styrene and acrylonitrile on a rubber-like polymer of at least butadiene, optionally mixed with a copolymer of at least styrene and acrylonitrile.

A glass fibre reinforced polycarbonate composition containing relatively large amounts of glass fibres, for example 30 to 50 mass %, exhibits high rigidity, strength and dimensional stability and can be applied for making parts that can replace metal parts. Such a composition often also should show good toughness, in particular an object obtained from such a composition should exhibit sufficient elongation at break in order to be able to withstand for example deformation arising as a screw is driven in, without crack and/or craze formation. Although polycarbonate is known to be a highly tough material, a glass fibre reinforced polycarbonate composition containing more than 10 mass % of glass fibres rather tends to exhibit a brittle character. The toughness of a polymer composition can in many cases be increased by adding an amount of a toughness-improving, or impact-modifying, elastomer.

A drawback of the known polycarbonate composition according to DE 3926904 A1 is that it does not show the desired toughness, especially when it contains relatively large amounts of glass fibres, that is from 30 to 50 mass %. Therefore, the object of the invention is to provide such a glass fibre reinforced and elastomer-modified polycarbonate composition that does not show said drawback or shows it at least to a lesser extent.

This object is achieved according to the invention with a polycarbonate composition that contains the following components:

a) 40–69.5 mass % of aromatic polycarbonate having a limiting viscosity number of 43–52 ml/g; as measured on a solution of polycarbonate in dichloromethane according to ISO 1628/4,
b) 30–50 mass % of sized glass fibres,
c) 0.5–5 mass % of at least one partially hydrogenated block copolymer containing at least two terminal polymer blocks A of a monoalkenylarene and at least one intermediate polymer block B of a conjugated diene, and optionally
d) 0–25 mass % of other additives, and wherein the sum of a)–d) is 100%.

The polycarbonate composition according to the invention exhibits high toughness, as manifested in for example increased elongation at break in a tensile test. Another advantage is that the composition also has a good colour and colour stability. A further advantage of the polycarbonate composition according to the invention is that it contains a relatively small amount of elastomer, as a result of which the composition exhibits high strength and rigidity. A further advantage of the invention is that the composition exhibits relatively low melt viscosity so that thin-walled objects, too, can be produced from it without problems. Yet another advantage is that the polycarbonate composition according to the invention exhibits improved resistance to crack formation as initiated by certain chemicals (improved ESCR, or environmental stress cracking resistance).

It is known from GB 2004284 A, DE 2839356 A1 and U.S. Pat No. 4,537,930 that adding a quantity of said partially hydrogenated block copolymer to a polycarbonate can improve a number of properties, but these publications focus on unreinforced compositions, or compositions containing not more than 5 mass % of glass fibres. Said publications do not describe that this measure will also be effective for increasing the toughness of compositions that contain 30 to 50 mass % of glass fibre, which compositions are known to have a different failure mechanism than unreinforced polycarbonate. In EP 0053825 A1 it is taught that in order to improve toughness of reinforced polycarbonate compositions unsized fibrous reinforcing agents should be applied, and optionally up to 10 mass % of said block copolymer. It is further stated that said block copolymer has a detrimental effect on stiffness, and results in only a minor improvement in impact strength, in any event, if applied in a composition containing sized reinforcing fibres.

The polycarbonate composition according to the invention contains inter alia 40–69.5 mass % of aromatic polycarbonate of specified viscosity. Suitable aromatic polycarbonates are polycarbonates made from at least a divalent phenol and a carbonate precursor, for example by means of an interfacial polymerization process. Suitable divalent phenols that may be applied are compounds having one or more aromatic rings that contain two hydroxy groups, each of which is directly linked to a carbon atom forming part of an aromatic ring. Examples of such compounds are 4,4'-dihydroxybiphenyl, 2,2-bis(4-hydroxyphenyl)propane (bisphenol A), 2,2-bis(4-hydroxy-3-methylphenyl)propane, 2,2-bis-(3-chloro-4-hydroxyphenyl)-propane, 2,2-bis-(3,5-dimethyl-4-hydroxyphenyl)-propane, 2,4-bis-(4-hydroxyphenyl)-2-methylbutane, 2,4-bis-(3,5-dimethyl-4-hydroxyphenyl)-2-methylbutane, 4,4-bis(4-hydroxyphenyl) heptane, bis-(3,5-dimethyl-4-hydroxyphenyl)-methane, 1,1-bis-(4-hydroxyphenyl)-cyclohexane, 1,1-bis-(3,5-dimethyl-4-hydroxyphenyl)-cyclohexane, 2,2-(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxyphenyl)methane, bis-(3,5-dimethyl-4-hydroxyphenyl)-sulphon, bis-4-hydroxyphenylsulphon, bis-4-hydroxyphenylsulphide.

The carbonate precursor may be a carbonyl halogenide, a halogen formate or carbonate ester. Examples of carbonyl halogenides are carbonyl chloride and carbonyl bromide. Examples of suitable halogen formates are bis-halogen formates of divalent phenols such as hydroquinone or of glycols such as ethylene glycol. Examples of suitable carbonate esters are diphenyl carbonate, di(chlorophenyl)carbonate, di(bromophenyl)carbonate, di(alkylphenyl)carbonate, phenyltolylcarbonate and the like and mixtures thereof. Although other carbonate precursors may also be used, it is preferred to use the carbonyl halogenides and in particular carbonyl chloride, also known as phosgene.

The aromatic polycarbonates in the composition according to the invention may be prepared using a catalyst, an acid acceptor and a compound for controlling the molecular mass.

Examples of catalysts are tertiary amines such as triethylamine, tripropylamine and N,N-dimethylaniline, quaternary ammonium compounds such as tetraethylammoniumbromide and quaternary phosphonium compounds such as methyltriphenylfosfoniumbromide.

Examples of organic acid acceptors are pyridine, triethylamine, dimethylaniline and so forth. Examples of inorganic acid acceptors are hydroxides, carbonates, bicarbonates and phosphates of an alkali metal or earth alkali metal.

Examples of compounds for controlling the molecular mass are monovalent phenols such as phenol, p-alkylphenols and para-bromophenol and secondary amines.

Such polycarbonates, their preparation and properties are described in detail in for example Encycl. Polym. Sci. Eng., 11, p. 648–718 (Wiley, New York, 1988) and in Kunststoff Handbuch, 3/1, p. 117–297 (Hanser Verlag, Muenchen, 1992).

The composition according to the invention contains a polycarbonate having a limiting viscosity number (LVN) of 43–52 ml/g as measured in dichloromethane. A polycarbonate of lower viscosity results in too low toughness of the composition, whereas a higher viscosity has a negative effect on dispersability of glass fibres and melt flow of the composition. Therefore, the polycarbonate applied in the composition preferably has a limiting viscosity number of 44–50, more preferably 45–48 ml/g.

The composition according to the invention preferably contains a polycarbonate derived from bisphenol A and phosgene and optionally minor amounts of other compounds having one, two or more than two reactive groups as comonomers, for instance for controlling the melt viscosity.

The polycarbonate composition according to the invention contains among other things 30–50 mass % of sized glass fibres. Suitable glass fibres normally have a diameter of 5 to 25 microns, preferably 7 to 15 microns. Sized glass fibres is understood to mean that the fibres have been provided with a coating or sizing, which is designed to improve both processability and adhesion to polycarbonate. Such glass fibres with sizing optimised for use in polycarbonate are commercially available. Glass fibres may be added to the composition according to the invention in the form of cut fibres a few millimetres long (also known as chopped strands). However, the composition may also contain glass fibres that are supplied to an extruder in the form of continuous fibres ('rovings'). The polycarbonate composition preferably contains chopped strands. The average length of the glass fibres in the composition according to the invention may vary between wide limits, but the average length preferably is about 0.1 to 0.5 mm. The advantage of a larger length is a higher strength of the composition, while shorter fibres enhance the processability of the composition. A further advantage is that articles made from them have a more isotropic character.

The polycarbonate composition according to the invention further contains 0.5–5 mass % of at least one partially hydrogenated hydrogenated block copolymer containing at least two terminal polymer blocks A of a monoalkenylarene and at least one intermediate polymer block B of a conjugated diene. Suitable partially hydrogenated block copolymers contain at least two terminal polymer blocks A of a monoalkenylarene having an average molecular mass of 5,000–125,000 and at least one intermediate polymer block B of a conjugated diene having an average molecular mass of 10000–300000 g/mol, with the terminal polymer blocks A accounting for 8-55 mass % of the block copolymer and with not more than 25% of the aromatic double bonds of the polymer blocks A and at least 80% of the aliphatic double bonds of the polymer blocks B being reduced through hydrogenation. If the monoalkenylarene in such block copolymers is styrene, they are also referred to as styrene/ethene-co-butene/styrene block copolymers, or SEBS for short. Such SEBS block copolymers may further contain a functional group for increasing polarity or for attaining reactivity with other polymers. The polycarbonate composition may also contain a mixture of different types of block copolymers, for example of different molecular masses, or a mixture of block copolymers that either have or do not have a functional group. Useful block copolymers for the compositions according to the invention are described in patent specification NL 183467 A and are commercially available under trade names such as Kraton™ G1650, G1651, G1652, G1657, G1726 and G1855 (Kraton Polymers, BE).

The composition according to the invention preferably contains 35 to 45 mass % of sized glass fibres. At such high glass fibre concentrations the advantages of the invention are most manifest, and a desired combination of strength, rigidity and toughness is obtained. In a particular embodiment according to the invention the composition contains 38–42, or about 40 mass % of glass fibres.

In a further preferred embodiment the composition according to the invention contains between 1 and 3 mass % of block copolymer, more preferably 0.75–4, or 1.5–2.5 mass %. Such a composition exhibits good toughness while retaining strength and rigidity, good flowability and improved ESCR. The composition according to the invention most preferably contains about 2 mass % of block copolymer, because that composition exhibits an optimum combination of properties.

The polycarbonate composition according to the invention may further contain from 0 to 25 mass % of one or more other additives. These include the customary additives such as stabilizers against thermal or thermo-oxidative degradation, stabilizers against hydrolytic degradation, stabilizers against degradation from light, in particular UV light, and/or photo-oxidative degradation, processing aids such as release agents and lubricants, colorants such as pigments and dyes, fillers including minerals such as wollastonite or aluminium silicates, or flame retardants. Suitable examples of such additives and their customary amounts are stated in the aforementioned Kunststoff Handbuch, 3/1.

Although a polycarbonate such as bisphenol-A polycarbonate in itself has a fairly good flame retarding behaviour, a polycarbonate composition is preferably rendered flame retardant by adding one or more flame retarding compounds. Suitable examples of flame retarding compounds are certain alkali or earth alkali sulphonates, sulphonamide salts, perfluoroborates, halogenated compounds, especially bromated aromatic compounds, and phosphorus-bearing organic compounds, especially phosphate esters such as triphenyl phosphate. Suitable phosphorus-bearing compounds are described in for example DE 19828535 A1 (Komponente E), in EP 0640655 A2 (Komponente D) and in EP 0363608 A1 (component C). As flame retarding compound use is preferably made of at least an oligomer phosphate ester, such as resorcinol diphenylphosphate (RDP), bisphenol-A diphenylphosphate (BDP) or mixtures thereof. Such compositions exhibit an excellent combination of mechanical, flame retarding and processing properties. Additionally the composition often contains a fluoropolymer such as polytetrafluoroethylene to enhance its dripping properties in a fire test.

The invention also relates to a process for making a glass fibre reinforced and elastomer modified polycarbonate composition according to the invention.

Publication DE 3926904 A1 describes a process for making a polycarbonate composition containing 30 to 93 mass % of polycarbonate, 5 to 50 mass % of glass fibre and 2 to 20 mass % of at least one elastomer. It is preferred to apply 6 to 15 mass % of an ABS as elastomer in the composition. DE 3926904 A1 teaches to produce these compositions by a process whereby first at least polycarbonate and glass fibres are melt-mixed, with an elastomer subsequently being added. This process aims to reduce the temperature increase during melt-mixing, and thus to reduce degradation of the elastomer, so producing a glass fibre reinforced polycarbonate composition with improved toughness.

A drawback of the known process according to DE 3926904 A1 is that the temperature increase during melt-mixing of polycarbonate and relatively large amounts of glass fibres, for example 30 to 50 mass %, is still such that a composition having the desired toughness is not obtained. A further drawback of the said process is that the specified staged addition and mixing of components is troublesome to carry out in practice and, moreover, results in more breakage of glass fibres particularly in the case of relatively large amounts of glass fibres, as a result of which the strength of the composition diminishes.

The object of the invention therefore is to provide a process for producing a glass fibre reinforced and elastomer-modified polycarbonate composition that does not have the said drawbacks or has those drawbacks to a lesser extent.

This object is achieved according to the invention by a process whereby the components as defined in Claim 1 are melt-mixed.

By the process according to the invention there is obtained a polycarbonate composition that exhibits a desired combination of rigidity, strength and toughness, the order in which the components are added not being critical and with a smaller temperature increase arising during melt-processing. Consequently the composition also has an improved colour and colour stability. A further advantage is that chopped glass fibres can be added to a molten mixture containing at least polycarbonate and block copolymer with the aid of a mixing extruder such as a twin-screw extruder. This presents the advantage that glass fibres are well dispersed and are not subject to serious breakage, whilst the melt temperature does not rise too far.

The process according to the invention can be carried out using mixing devices customary for producing a polymer composition by melt-mixing the components. Suitable mixing devices are single-screw or twin-screw extruders, preferably twin-screw extruders having a feeding system to the melt, in particular for feeding glass fibres. In general, the components are fed to the extruder in dry form, optionally pre-mixed, and then melt-mixed, whereupon the mixture obtained is extruded into strands and chopped into granules. The melt temperature may increase to well above 300° C. because of the high viscosity and high shear forces. However, it is preferred for the melt temperature during mixing not to increase to more than 350° C., in particular not to more than 340° C.

The invention also relates to moulded parts that contain the polycarbonate composition according to the invention. The invention relates in particular to a moulded part produced by injection moulding of the composition according to the invention. Advantages of such a moulded part are good mechanical properties, in particular high strength and rigidity, and good toughness, in particular improved resistance to crack formation as initiated by certain chemicals such as organic solvents (i.e. good environmental stress cracking resistance or ESCR). Such moulded parts may replace for example metal moulded parts, with especially lower weight and greater design freedom being advantageous. This is especially advantageous for moulded parts that are a structural element of a small but complex appliance such as a mobile telephone (GSM), a personal digital assistant (PDA), and the like. The improved toughness allows higher loading of screwed joints or 'snap fit' joints between moulded parts.

The invention accordingly also relates to an article that contains a moulded part produced from the composition according to the invention.

The invention will now be elucidated with reference to the following examples and comparative experiments.

Materials
  Polycarbonate: use was made of bisphenol A polycarbonates with a limiting viscosity number of about 48, 45 and 41 ml/g, indicated as polycarbonate A, B, and C, respectively;
  Glass fibres: standard glass fibres with a diameter of 14 microns, chopped length 4 mm and with a sizing suitable for polycarbonate;
  Block copolymer: an SEBS, type Kraton™ G1650 (Kraton Polymers, BE);
  ABS: a mixture of Ronfalin® FZ311 and Ronfalin® FZ330 in the ratio of 10/6.5 (DSM, NL).

Determination of Properties
  LVN: the limiting viscosity number was measured on a solution of polycarbonate in dichloromethane according to ISO 1628/4;
  MFI: the melt flow index was determined at 300° C. and a load of 1.2 kg according to ISO 1133;
  Tensile strength and elongation at break were determined according to ISO 527-1 using a standard test bar injection-moulded to Campus guidelines;
  Impact strength: the impact strength of a standard test bar was measured according to the Izod reversed notched method (ISO 180-4AR);
  ESCR: the environmental stress cracking resistance was determined by measuring a test bar's elongation at break after 30 minutes' exposure to a 1/3 toluene/propanol mixture and application of a particular pre-strain using a jig (ASTM 638/M3);
  Screw test: the resistance to crack and/or craze formation from deformation and the presence of chemicals was determined on an injection-moulded object made from the composition and having a hollow, cylindrical projection with outside and inside diameters of 4.1 and 2.0 mm, respectively. A cylindrical screw of outside diameter 2.35 mm was driven into the hollow cylinder with a force of 0.4 Nm using a torque screw driver. Next, the object with the screw was submerged in a 1/3 toluene/propanol mixture for 30 seconds. Crack formation, if any, was observed visually.

EXAMPLE 1 AND COMPARATIVE EXPERIMENTS A–C

The components stated in Table 1 plus a stabilizer combination consisting of 0.05 mass % of a phosphite compound (Irgafos 168) and 0.2 mass % of a hindered phenol compound (Irganox 1076), 0.4 mass % release agent (Loxiol EP861) and a mixture of colouring agents consisting essentially of about 1.5 mass % of $TiO_2$ were mixed in a W&P ZSK40 twin-screw extruder at a speed of 350 rpm and temperature setting of 260–280° C., by feeding polycarbonate, elastomer and additives to the throat and adding glass fibres to the melt using a side feeder. In the case of the compositions that contained SEBS a lower melt temperature was observed, with the extruder throughput and torque being higher and lower, respectively (in particular Example 1 versus Comp. Exp. A).

The dark grey granules thus obtained were then injection-moulded into test bars at a temperature setting of 280–290° C.

Example 1 exhibits distinctly better toughness, higher elongation at break and higher impact strength than the composition without elastomer, whilst the presence of ABS does result in lower tensile strength but not in improved toughness. In addition, the injection-moulded products that contain ABS exhibit somewhat lower rigidity (tensile modulus).

EXAMPLE 2 AND COMPARATIVE EXPERIMENTS D–F

The compositions stated in Table 2 were made analogously to Example 1 and comparative experiments A–C except that the extruder speed was higher. The compositions also contained the aforementioned additives. As a result, the melt temperature observed for Comp. Exp. A increased to 350° C., while addition of only 2 mass % of SEBS resulted in a significant temperature decrease, also when ABS was also present.

Injection-moulded products according to Example 2 again exhibited higher toughness than compositions D–F, with the tensile strength also being higher than for E and F. The ESCR tests, too, revealed higher toughness and resistance to organic solvents.

In a screw test, only Example 2 did not show any damage after deformation by driving in a screw and exposure to a mixture of solvents.

EXAMPLES 3–4 AND COMPARATIVE EXPERIMENT G

The compositions stated in Table 3 were made analogously to Example 1. Example 3 indicates that toughness improvement is also observed for a slightly increased glass fibre content. If the viscosity of the polycarbonate is somewhat decreased an even better balance of properties is observed (Ex. 4). Further decreasing the viscosity of polycarbonate results in a drop of properties. Apparently there is an optimum range of polycarbonate viscosity for the present elastomer-modified compositions containing high amounts of glass fibres.

TABLE 1

|  | unit | Example 1 | Comp. Exp. A | Comp. Exp. B | Comp. Exp. C |
|---|---|---|---|---|---|
| Composition |  |  |  |  |  |
| Polycarbonate A | Parts by | 58 | 60 | 43.5 | 41.5 |
| Glass fibre | mass | 40 | 40 | 40 | 40 |
| Block copolymer |  | 2 | 0 | 0 | 2 |
| ABS |  | 0 | 0 | 16.5 | 16.5 |
| Mixing at 350 rpm |  |  |  |  |  |
| Throughput | kg/hour | 139 | 122 | 138 | 140 |
| Torque | % | 80 | 85 | 76 | 76 |
| Melt temperature | ° C. | 336 | 345 | 327 | 312 |
| Properties |  |  |  |  |  |
| MFI (300° C./1.2 kg) | dg/min | 10.7 | 10.5 | 6.7 | 6.3 |
| Tensile strength | MPa | 93 | 90 | 80 | 81 |
| Elongation at break | % | 1.8 | 1.4 | 1.2 | 1.3 |
| Impact resistance | $kJ/m^2$ | 24 | 23 | 15 | 16 |

TABLE 2

|  | unit | Example 2 | Comp. Exp. D | Comp. Exp. E | Comp. Exp. F |
|---|---|---|---|---|---|
| Composition |  |  |  |  |  |
| Polycarbonate A | Parts by | 58 | 60 | 43.5 | 41.5 |
| Glass fibre | mass | 40 | 40 | 40 | 40 |
| Block copolymer |  | 2 | 0 | 0 | 2 |
| ABS |  | 0 | 0 | 16.5 | 16.5 |
| Mixing at 417 rpm |  |  |  |  |  |
| Throughput | kg/hour | 140 | 140 | 142 | 140 |
| Torque | % | 75 | 82 | 78 | 72 |
| Melt temperature | ° C. | 326 | 350 | 325 | 315 |
| Properties |  |  |  |  |  |
| MFI (300° C./1.2 kg) | dg/min | 9.5 | 10.7 | 7.0 | 6.4 |
| Tensile strength | MPa | 95 | 98 | 80 | 80 |
| Elongation at break | % | 1.8 | 1.5 | 1.2 | 1.3 |
| Impact resistance | $kJ/m^2$ | 29 | 26 | 14 | 15 |
| ESCR; elongation at break |  |  |  |  |  |
| 0% pre-strain | % | 1.9 | 1.4 | 1.2 | 1.3 |
| 0.5% pre-strain | % | 1.8 | 1.4 | 1.2 | 1.3 |
| 0.8% pre-strain | % | 1.8 | 1.7 | 1.2 | 1.2 |
| Screw test |  | no cracks | cracks | cracks | cracks |

TABLE 3

|  | unit | Example 3 | Example 4 | Comp. Exp. G |
|---|---|---|---|---|
| Composition |  |  |  |  |
| Polycarbonate A | Parts by | 56 |  |  |
| Polycarbonate B | mass |  | 56 |  |
| Polycarbonate C |  |  |  | 56 |
| Glass fibre |  | 42 | 42 | 42 |
| Block copolymer |  | 2 | 2 | 2 |
| Properties |  |  |  |  |
| MFI (300° C./1.2 kg) | dg/min | 10.2 | 16.0 | 26.5 |
| Tensile strength | MPa | 95 | 96 | 85 |
| Elongation at break | % | 1.8 | 1.8 | 1.4 |
| Impact resistance | $kJ/m^2$ | 24 | 26 | 14 |
| Screw test |  | No cracks | No cracks | cracks |

The invention claimed is:

1. Glass fibre reinforced and elastomer-modified polycarbonate composition that contains the following components:
a) 40–69.5 mass % of aromatic polycarbonate having a limiting viscosity number of 43–52 ml/g; as measured on a solution of polycarbonate in dichloromethane according to ISO 1628/4, b) 30–50 mass % of sized glass fibres, c) 0.5–5 mass % of at least one partially hydrogenated block copolymer containing at least two terminal polymer blocks A of a monoalkenylarene and at least one intermediate polymer block B of a conjugated diene, and optionally d) 0–25 mass % of other additives, wherein the sum of a)–d) is 100%.

2. Polycarbonate composition according to claim 1, wherein the polycarbonate is derived from bisphenol A and phosgene.

3. Polycarbonate composition according to claim 1, wherein the glass fibres have an average length of 0.1 to 0.5 mm.

4. Polycarbonate composition according to claim 1, wherein the block copolymer is a styrene/ethene-co-butene/styrene block copolymer (SEBS).

5. Polycarbonate composition according to claim 1 that contains 35–45 mass % of glass fibres.

6. Polycarbonate composition according to claim 1, that contains 1–3 mass % of block copolymer.

7. Process for making a glass fibre reinforced and elastomer-modified polycarbonate composition according to claim 1, wherein the various components are melt-mixed.

8. Process according to claim 7 wherein chopped glass fibres are added to a molten mixture containing at least polycarbonate and block copolymer.

9. Moulded part that contains the polycarbonate composition according to claim 1.

10. Moulded part produced by injection moulding of the polycarbonate composition according to claim 1.

11. Article that contains at least a moulded part according to claim 9.

12. Polycarbonate composition according to claim 2, wherein the glass fibres have an average length of 0.1 to 0.5 mm.

13. Article that contains at least a moulded part according to claim 10.

* * * * *